(12) United States Patent
Kownacki et al.

(10) Patent No.: US 6,404,589 B1
(45) Date of Patent: Jun. 11, 2002

(54) LIGHT-WEIGHT VIDEO CASSETTE

(75) Inventors: Charles D. Kownacki, Erie; Gregory N. Farrell, Sr., Waterford, both of PA (US)

(73) Assignee: Precise Plastics, Fairview, PA (US)

( * ) Notice: Subject to any disclaimer, the term of this patent is extended or adjusted under 35 U.S.C. 154(b) by 0 days.

(21) Appl. No.: 09/542,264

(22) Filed: Apr. 4, 2000

(51) Int. Cl.⁷ .................................. G11B 23/02
(52) U.S. Cl. ....................................... 360/132
(58) Field of Search ................ 360/132, 133; 369/291

(56) References Cited

U.S. PATENT DOCUMENTS

| | | | | |
|---|---|---|---|---|
| 5,568,899 A | * | 10/1996 | Krantz et al. | 360/132 |
| 5,582,358 A | * | 12/1996 | Shin et al. | 360/132 |
| 5,626,305 A | * | 5/1997 | Hashizume et al. | 360/132 |
| 6,056,224 A | * | 5/2000 | Shiga et al. | 360/132 |

* cited by examiner

*Primary Examiner*—Allen Cao
(74) *Attorney, Agent, or Firm*—Richard K. Thomson

(57) ABSTRACT

A video cassette includes a skeletal structure with a polymeric sheet material stretched over its transverse faces and weighs less than 1 oz. to reduce shipping costs on high volume mailings. The polymeric sheeting material which may, for example, be vinyl or mylar with pre-printed graphics is attached using a heat staking process or an adhesive.

8 Claims, 3 Drawing Sheets

LIGHT-WEIGHT VIDEO CASSETTE

BACKGROUND AND SUMMARY OF THE INVENTION

The present invention is directed to a light-weight video cassette. More particularly, this invention is directed to a video cassette having a skeletal structure and an external skin of with advertising graphics, or the like, thereon and, preferably, weighing less than 1 oz.

In a number of applications for video tapes, such as promotional tapes, demo tapes, advertisements, etc., tapes are reproduced in quantity and mailed to prospective or actual clients. Often the weight of the tape results in the mailing costs exceeding the cost of the tape itself.

A number of attempts have been made to reduce the overall weight of the tape cassette. Some of these designs employ a styrofoam core and a reduced number of pieces. While these attempts have met with some limited success, it is believed the present invention affords a better solution.

In one aspect, the present invention comprises a light weight video cassette having a) a first frame half having a first lateral peripheral wall; b) a second frame half having a second lateral peripheral wall; c) a living hinge member interconnecting the first half and second halves, the living hinge member being attached to a first portion of the first lateral peripheral wall and a first portion of the second lateral peripheral wall and having a flat portion lying generally coplanar with a first lateral face of said first frame half and a first lateral face of said second frame half, whereby the first frame half can be folded in toward the flat portion of the living hinge member onto the second frame half without the flat portion of the living hinge member interfering with the first and second lateral peripheral walls.

In another aspect of the invention, the light weight video cassette comprises a first frame half having a first lateral peripheral wall defining a first transverse face and a first array of reinforcing ribs attached to one edge of said first lateral peripheral wall; a second frame half having a second lateral peripheral wall defining a second transverse face and a second array of reinforcing ribs attached to one edge of said lateral peripheral wall; means for interconnecting said first and second frame halves; a skin covering attached to said first and second transverse faces. The skin is preferably made of a polymeric sheet material such as vinyl or mylar which may be attached to the transverse faces using a heat staking process or using an adhesive.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which

FIG. 3 is a is a cross-sectional side view of the living hinge used in the first embodiment as seen along line 3—3 in FIG. 1.

DETAILED DESCRIPTION OF PREFERRED EMBODIMENT(S)

Figure 1:
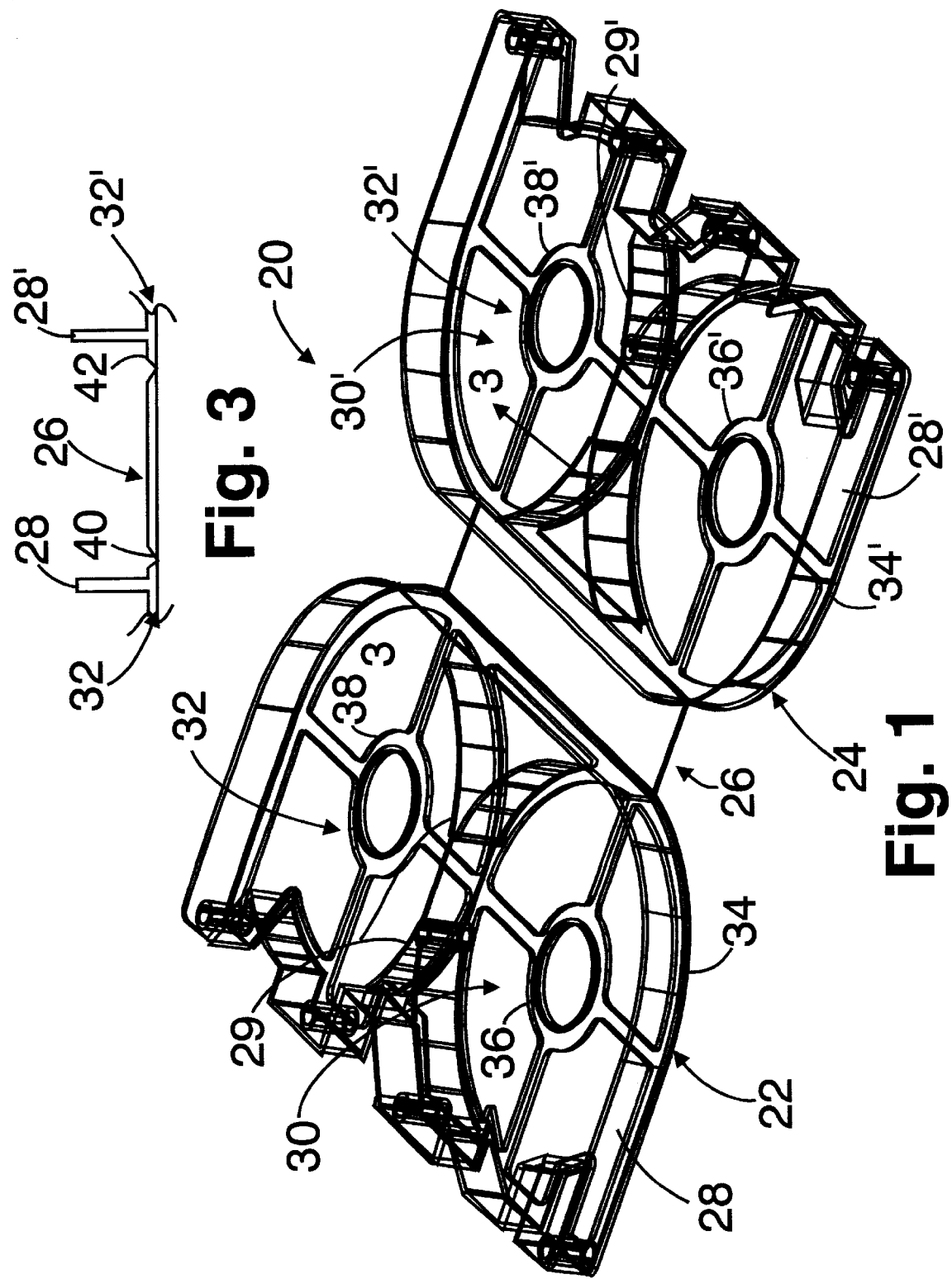
FIG. 1 is a perspective view of a first embodiment of the light-weight video cassette of the present invention.
Figure 2:
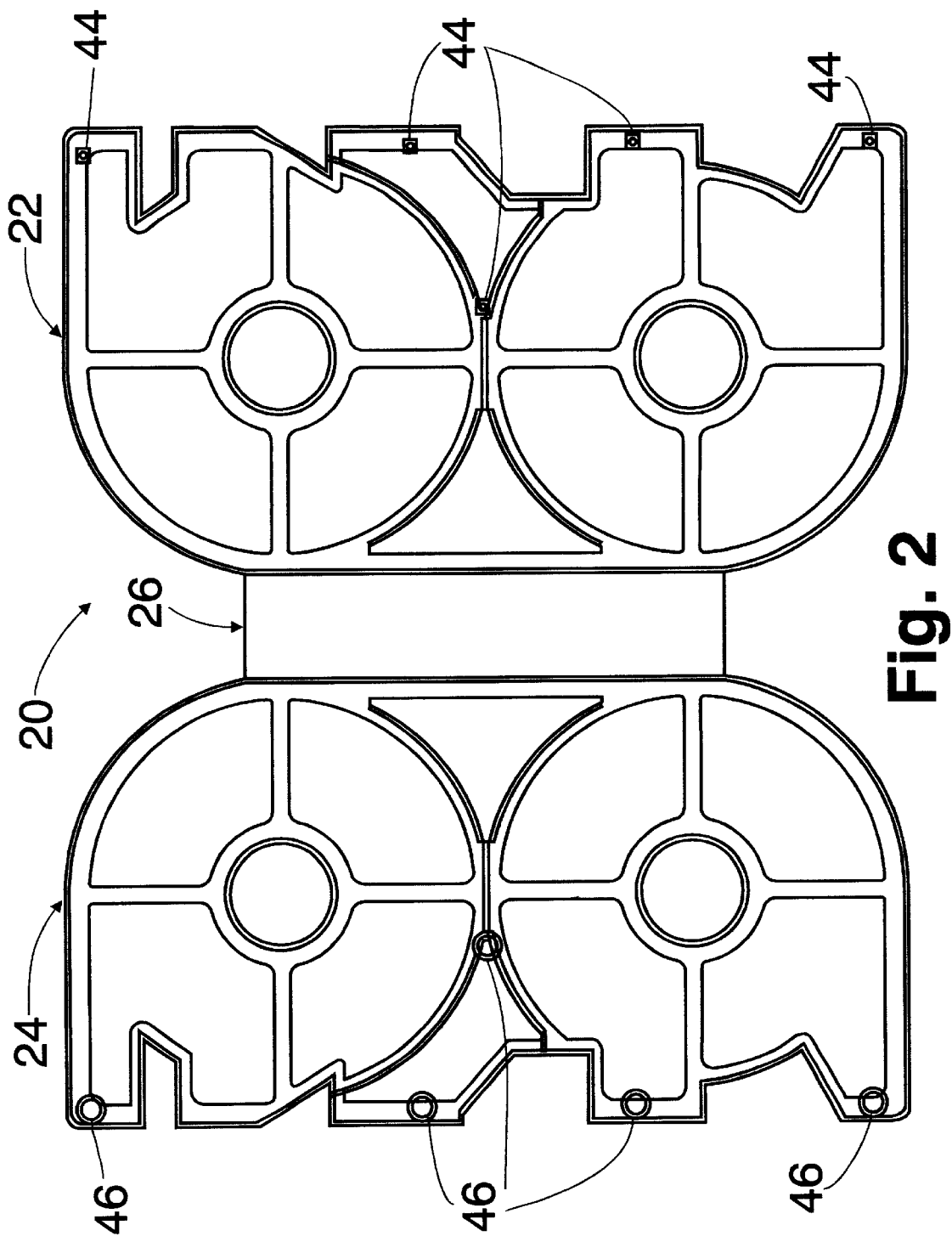
FIG. 2 is a front view of the first embodiment.
Figure 4:
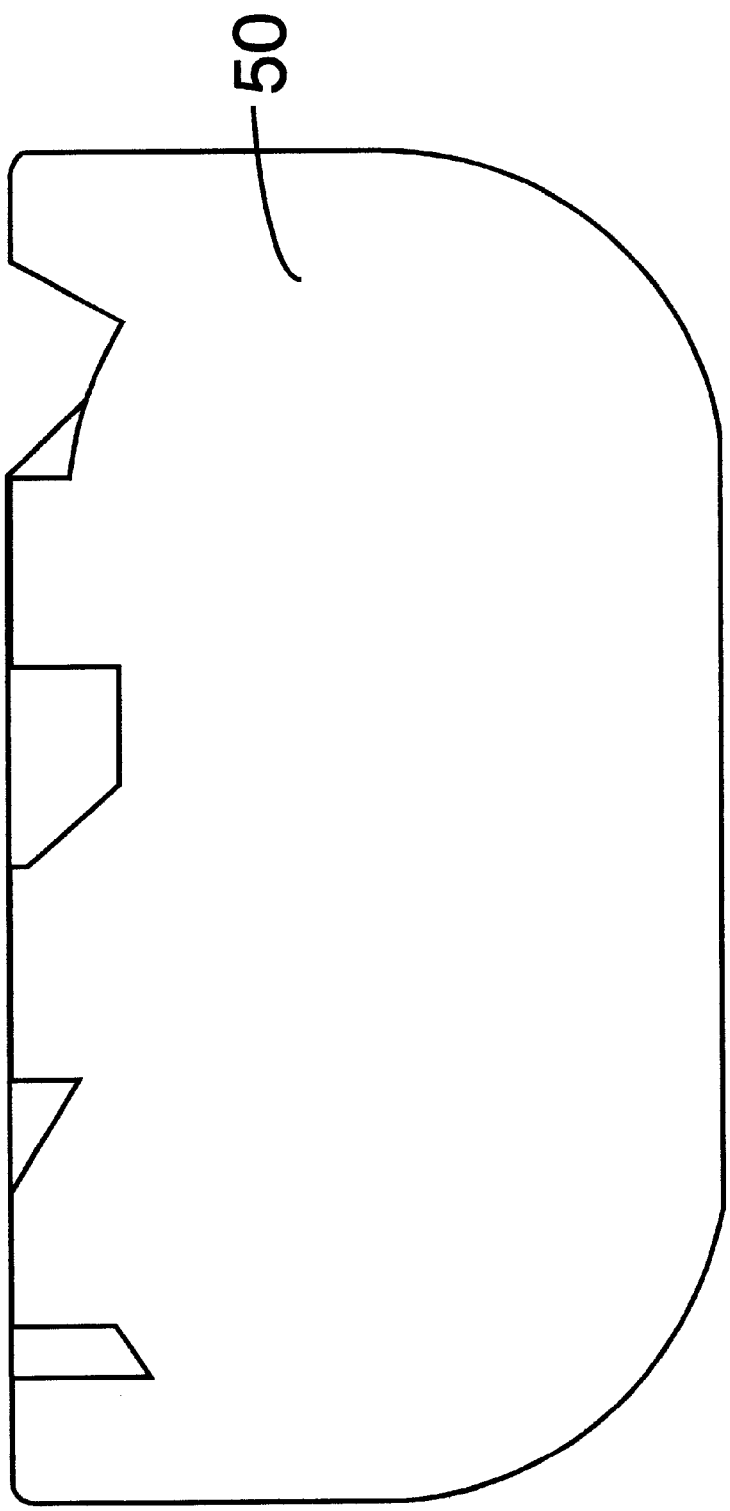
FIG. 4 is a front view of the first embodiment with a skin in place.

The light-weight video cassette of the present invention is shown generally at 20 in FIGS. 1 and 2. Cassette 20 comprises a first half 22, a second half 24, and a living hinge 26 which interconnects the two halves 22 and 24. First half 22 comprises an outer peripheral wall 28 which defines a first transverse face 30 and an array of reinforcing ribs 32 attached to edge 34 of wall 28. Reinforcing ribs 32 include first circular rib 36 which supports a first spool (not shown) and a second circular rib 38 which supports a second spool (not shown). Second half 24 includes an outer peripheral wall 28' which defines a second transverse face 30', an array of reinforcing ribs 32' attached to edge 34' and including third circular rib 36' and fourth circular rib 38' which cooperate with first (36) and second (38) circular ribs to mount the two spools. Internal walls 29 and 29' protect the tape spools and provide additional rigidity to the cassette 20 and afford additional connecting points for the outer skin 50, 50'.

Living hinge 26 is attached to first portions of peripheral walls 28 and 28'. Hinge 26 is provided with clearance grooves 40 and 42 which permit halves 22 and 24 to be folded inwardly toward one another without interference from the hinge 26. Posts 44 in first half 22 may be square and fit within circular posts 46, the interference fit being the only means of retaining the cassette 20 closed. Alternatively, screws (not shown) can be received in threaded portions of posts 44 to keep the cassette closed in a more conventional manner. Some of the circular posts 46 may be equipped with bushings for the video tape to ride upon as is customary. The weight of the cassette 20 will be less than 1 oz. greatly reducing the shipping costs. The outside of the first and second transverse faces 30, 30' is formed by a skin 50 of opaque polymeric sheet material such as vinyl or mylar. Preferably, this skin 50 has pre-printed graphics indicating the source of the goods and/or the nature of the material contained on the tape. Skin 50 is attached to the reinforcing ribs 32 by heat staking, adhesive or other conventional attachment technique.

The light-weight video cassette 20 of the present invention has sufficient structure to house and protect the tape without providing unnecessary bulk which merely adds weight. The cassette 20 of the present invention weighs less than 1 oz. providing an inexpensively shippable cassette for applications requiring mass mailing. The skin 50 is easily attached to the housing frame and incorporates its own graphics making the attachment of separate labels unnecessary.

Various changes, alternatives and modifications will become apparent to one of ordinary skill in the art following a reading of the foregoing specification. It is intended that any such changes, alternatives and modifications as fall within the scope of the appended claims be considered part of the present invention.

We claim:

1. A light-weight video cassete for protecting video tape, said cassette comprising
   a) a first frame half having a first lateral peripheral wall;
   b) a second frame half having a second lateral peripheral wall;
   c) a living hinge member interconnecting and integral with said first half and said second half, said living hinge member being attached to a first portion of said first lateral peripheral wall and a first portion of said second lateral peripheral wall and having a flat portion lying generally coplanar with a first lateral face of said first frame half and a first lateral face of said second frame half;
      whereby said first frame half is folded in toward said flat portion of said living hinge member onto said second frame half without said flat portion of said living hinge member interfering with said first and second lateral peripheral walls to enclose the video tape.

2. A light-weight video cassette comprising:
a) a first frame half having
   i) a first lateral peripheral wall defining a first open-sided transverse face;
   ii) a first array of reinforcing ribs attached to one edge of said first lateral peripheral wall;
b) a second frame half having
   i) a second lateral peripheral wall defining a second open-sided transverse face;
   ii) a second array of reinforcing ribs attached to one edge of said lateral peripheral wall;
c) means for interconnecting said first and second frame halves;
d) a skin covering attached to said first and second transverse faces.

3. The light-weight video cassette of claim 2 wherein said first and second frame halves together weigh less that one ounce.

4. The light-weight video cassette of claim 2 wherein said skin is made of polymeric sheet material.

5. The light-weight video cassette of claim 4 wherein said skin has graphics printed directly thereon.

6. The light-weight video cassette of claim 2 wherein said means for interconnecting said first and second frame halves comprises a living hinge integral with and attached to a first portion of said first lateral peripheral wall and a first portion of said second lateral peripheral wall, said living hinge being generally coplanar with said first edge of said first lateral peripheral wall and with said first edge of said second lateral peripheral wall.

7. The light-weight video cassette of claim 6 wherein said means for interconnecting said first and second frame halves further comprises a first series of posts on said first frame half which are received within a second series of posts on said second half.

8. The light-weight video cassette of claim 6 wherein said living hinge comprises a flat portion which has a clearance groove adjacent each of its edges which permit each said lateral peripheral wall to be folded toward said flat portion without interfering therewith.

* * * * *